United States Patent
Godin et al.

(10) Patent No.: US 12,457,626 B2
(45) Date of Patent: Oct. 28, 2025

(54) METHODS AND APPARATUSES FOR RADIO COMMUNICATION

(71) Applicant: Nokia Solutions and Networks Oy, Espoo (FI)

(72) Inventors: Philippe Godin, Versailles (FR); David Navrátil, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 355 days.

(21) Appl. No.: 18/006,058

(22) PCT Filed: Aug. 3, 2020

(86) PCT No.: PCT/EP2020/071791
§ 371 (c)(1),
(2) Date: Jan. 19, 2023

(87) PCT Pub. No.: WO2022/028667
PCT Pub. Date: Feb. 10, 2022

(65) Prior Publication Data
US 2023/0284243 A1    Sep. 7, 2023

(51) Int. Cl.
*H04W 72/30*    (2023.01)
*H04W 28/02*    (2009.01)
*H04W 72/543*   (2023.01)

(52) U.S. Cl.
CPC ....... *H04W 72/30* (2023.01); *H04W 28/0263* (2013.01); *H04W 72/543* (2023.01)

(58) Field of Classification Search
CPC ............................ H04W 72/30; H04W 72/543; H04W 28/0263
See application file for complete search history.

(56) References Cited

U.S. PATENT DOCUMENTS

2015/0358853 A1* 12/2015 Kiss ................. H04W 28/0263
                                                    370/230
2016/0094358 A1    3/2016 Won et al.
(Continued)

FOREIGN PATENT DOCUMENTS

CN    101473616 A    7/2009
GB    2485237 A    5/2012
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
(Continued)

*Primary Examiner* — Ajay Cattungal
(74) *Attorney, Agent, or Firm* — Nokia Solutions and Networks Oy

(57) ABSTRACT

There is provided a method comprising transmitting (102) a request (MR #1) indicating a de-mapping of at least one QoS flow from a unicast radio channel (UCH) between a secondary node (SN) and a radio terminal (UE), and indicating a mapping of the at least one QoS flow to a multicast radio channel (MCH) between the secondary node (SN) and a plurality of radio terminals, the plurality of radio terminals comprising the radio terminal (UE); and demapping (108) received user plane data (upd) associated with the at least one QoS flow from the unicast radio channel (UCH); and mapping (110) the received user plane data (upd) associated with the at least one QoS flow to the multicast radio channel (MCH).

16 Claims, 5 Drawing Sheets

(56) References Cited

U.S. PATENT DOCUMENTS

| | | | |
|---|---|---|---|
| 2017/0374581 A1 | 12/2017 | Dao | |
| 2018/0124632 A1* | 5/2018 | Thubert | H04L 49/201 |
| 2018/0338265 A1* | 11/2018 | Goel | H04W 40/12 |
| 2019/0253938 A1* | 8/2019 | Sayenko | H04W 36/08 |
| 2020/0092923 A1 | 3/2020 | Abraham et al. | |
| 2021/0068004 A1* | 3/2021 | Kadiri | H04W 28/0263 |
| 2022/0224438 A1* | 7/2022 | Park | H04W 72/0446 |
| 2024/0129785 A1* | 4/2024 | Chai | H04W 76/15 |

FOREIGN PATENT DOCUMENTS

| | | |
|---|---|---|
| GB | 2522665 A | 8/2015 |
| JP | 2013545322 A | 12/2013 |
| JP | 2014060777 A | 4/2014 |
| JP | 2017510162 A | 4/2017 |
| WO | 2019/114939 A1 | 6/2019 |
| WO | 2019/160298 A1 | 8/2019 |
| WO | 2019/223005 A1 | 11/2019 |

OTHER PUBLICATIONS

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; NG-RAN; Xn general aspects and principles (Release 15)", 3GPP TS 38.420, V15.2.0, Dec. 2018, pp. 1-15.

"New Work Item on NR support of Multicast and Broadcast Services", 3GPP TSG RAN Meeting #86, RP-193248, Agenda Item: 9.1.2, Huawei, Dec. 9-12, 2019, 5 pages.

Säily et al., "5G Radio Access Networks: Enabling Efficient Point-to-Multipoint", IEEE Vehicular Technology Magazine, vol. 14, No. 4, Dec. 2019, pp. 29-37.

International Search Report and Written Opinion received for corresponding Patent Cooperation Treaty Application No. PCT/EP2020/071791, dated Jun. 21, 2021, 12 pages.

"KI1: Update to Solution #3: Add support for UE leaving MBS", 3GPP TSG-WG SA2 Meeting #139E e-meeting, S2-2004699, Agenda Item: 8.9, Huawei, Jun. 1-12, 2020, 4 pages.

Office action received for corresponding Japanese Patent Application No. 2023-507768, dated Jan. 22, 2024, 3 pages of office action and 2 pages of summary available.

Office action received for corresponding Chinese Patent Application No. 202080105793.7, dated Jun. 28, 2024, 8 pages of office action and no page of translation available.

"KI #1, new Solution Integrated Multicast and Unicast Transport with multicast distribution tree established by RAN nodes", SA WG2 Meeting #139E, S2-2004279, Agenda Item: 8.9, Nokia, Jun. 1-12, 2020, pp. 1-11.

"Update to Solution 3: Integrated Multicast and Unicast Transport", 3GPP TSG-WG SA2 Meeting #139E e-meeting, S2-2004063, Agenda Item: 8.9, China Mobile, Jun. 1-12, 2020, pp. 1-4.

"KI #4, New Sol: QoS support for MBS service", SA WG2 Meeting #S2-139E, S2-2004178, Agenda Item: 8.9, CATT, Jun. 1-12, 2020, pp. 1-3.

* cited by examiner

METHODS AND APPARATUSES FOR RADIO COMMUNICATION

RELATED APPLICATION

This application was originally filed as PCT Application No. PCT/EP2020/071791, filed on Aug. 3, 2020, which is incorporated herein by reference in its entirety.

FIELD OF THE INVENTION

Various example embodiments relate to enhancements for dual- or multi-connectivity in radio networks.

BACKGROUND

Dual-Connectivity provides means to serve a UE via at least two separated network nodes.

SUMMARY

According to a first aspect of the description, a method is provided, the method comprising: transmitting a request indicating a de-mapping of at least one QoS flow from a unicast radio channel between a secondary node and a radio terminal, and indicating a mapping of the at least one QoS flow to a multicast radio channel between the secondary node and a plurality of radio terminals, the plurality of radio terminals comprising the radio terminal; de-mapping received user plane data associated with the at least one QoS flow from the unicast radio channel; and mapping the received user plane data associated with the at least one QoS flow to the multicast radio channel.

The switch from the unicast channels to the multicast channel enables multicast applications in dual connectivity or multi connectivity cases. Resource usage is decreased and spectrum efficiency is increased as the multicast channel can be used instead of a plurality of unicast channels.

According to an advantageous example, the transmitted request comprises an indication for setting up of a first radio bearer associated with the multicast radio channel.

Advantageously, bearer setup is triggered via the transmitted request.

According to an advantageous example, the transmitted request comprises an indication for releasing a second radio bearer associated with the unicast channel.

Advantageously, bearer release is triggered via the transmitted request.

According to an advantageous example, the method comprises: creating the second radio bearer associated with the unicast channel; and mapping of the at least one QoS flow to the unicast radio channel using the created second radio bearer.

Advantageously, the unicast channel is setup and used prior to establishing or using the multicast channel.

According to an advantageous example, the method comprises: mapping of the at least one QoS flow to the unicast radio channel using the existing second radio bearer associated with the unicast channel.

Advantageously, already existing bearer setups are used without involving a further bearer setup.

According to an advantageous example, the method comprises: receiving a request indicating a setup of the at least one QoS flow at the secondary node and comprising a service identifier associated with the at least one QoS flow.

Advantageously, the received request triggers the setup of the at least one QoS flow at the SN.

According to an advantageous example, the de-mapping of the received user plane data associated with the at least one QoS flow from the unicast radio channel is based on the received service identifier and wherein the mapping of the received user plane data associated with the at least one QoS flow to the multicast radio channel is based on the received service identifier.

Therefore, the service identifier enables the SN to count the recipients of the service associated with the service identifier.

According to an advantageous example, the method comprises: determining a first number of UEs to be served and/or being served by the secondary node with the user plane data associated with the service identifier; and wherein, if the determined first number of UEs is above a threshold, the de-mapping of the received user plane data associated with the at least one QoS flow from the unicast radio channel and the mapping of the received user plane data associated with the at least one QoS flow to the multicast radio channel is conducted.

Advantageously, the SN switches to the multicast channel in order to release unicast channels. Therefore, spectrum efficiency is increased.

According to an advantageous example, the method comprises: determining a second number of UEs to be served and/or being served with the user plane data associated with the service identifier; transmitting, if the determined second number of UEs is below a threshold, a further request indicating a mapping of the at least one QoS flow to the unicast radio channel between the secondary node and the radio terminal, and indicating a de-mapping of the at least one QoS flow from the multicast radio channel between the secondary node and the plurality of radio terminals, the plurality of radio terminals comprising the radio terminal; and de-mapping, if the determined second number of UEs is below the threshold, the received user plane data associated with the at least one QoS flow from the multicast radio channel; and mapping, if the determined second number of UEs is below the threshold, the received user plane data associated with the at least one QoS flow to respective unicast channels.

Advantageously, the SN switches to the unicast channel in order to release the multicast channel. Therefore, spectrum efficiency is increased by such switch.

According to an advantageous example, the method comprises: receiving a further request indicating a release of the at least one QoS flow at the secondary node and comprising a service identifier associated with this at least one QoS flow; and wherein the de-mapping of the received user plane data from the multicast radio channel is based on the received service identifier and wherein the mapping of the received user plane data to the unicast radio channel for other UEs is based on the received service identifier.

Advantageously, the received further request allows spectrum efficiency.

According to an advantageous example, a service associated with the at least one QoS flow is a multicast data service and/or the service identifier identifies the multicast data service identifier.

According to a second aspect of the description, a method comprises: receiving a request indicating a de-mapping of at least one QoS flow from a unicast radio channel between a secondary node and a radio terminal, and indicating a mapping of the at least one QoS flow to a multicast radio channel between the secondary node and a plurality of radio terminals, the plurality of radio terminals comprising the radio terminal; determining a radio resource configuration message indicating the de-mapping of the at least one QoS flow from the unicast control channel between the secondary node and the radio terminal and indicating the mapping of the at least one QoS flow to the multicast radio channel between the secondary node and the radio terminal based on the received request; and transmitting the radio resource configuration message to the UE.

The switch from the unicast channels to the multicast channel enables multicast applications in dual connectivity or multi connectivity cases. Resource usage is decreased and spectrum efficiency is increased as the multicast channel can be used instead of a plurality of unicast channels.

According to an advantageous example, the method comprises: receiving a further request indicating a mapping of the at least one QoS flow to the unicast radio channel between a secondary node and the radio terminal, and indicating a de-mapping of the at least one QoS flow from the multicast radio channel between the secondary node and the plurality of radio terminals, the plurality of radio terminals comprising the radio terminal; determining a further radio resource configuration message indicating the mapping of the at least one QoS flow to the unicast radio channel, and indicating the de-mapping of the at least one QoS flow from the multicast radio channel based on the received further request; and transmitting the further radio resource configuration message to the UE.

Advantageously, the SN switches to the unicast channel in order to release the multicast channel. Therefore, spectrum efficiency is increased.

According to a third aspect of the description, a method comprises: receiving a radio resource configuration message indicating a de-mapping of at least one QoS flow from the unicast control channel between a radio terminal and a secondary node, and indicating a mapping of the at least one QoS flow to a multicast radio channel between the secondary node and a plurality of radio terminals, the plurality of radio terminals comprising the radio terminal; and receiving user plane data associated with the at least one QoS flow via the multicast radio channel indicated via the radio resource configuration message.

The switch from the unicast channels to the multicast channel enables multicast applications in dual connectivity or multi connectivity cases. Resource usage is decreased and spectrum efficiency is increased as the multicast channel can be used instead of a plurality of unicast channels.

According to an advantageous example, the radio resource configuration message indicates a release of the unicast radio bearer associated with the de-mapped at least one QoS flow.

Advantageously, the radio resource configuration message triggers the release of the unicast radio bearer.

According to an advantageous example, the method comprises receiving a further radio resource configuration message indicating a mapping of the at least one QoS flow to the unicast radio channel, and indicating a de-mapping of the at least one QoS flow from the multicast radio channel; and receiving user plane data associated with the at least one QoS flow via the unicast radio channel indicated via the further radio resource configuration message.

Advantageously, the user plane data is received from the secondary node via the unicast data. The multicast channel is de-mapped and can be used for other multicast purposes potentially reducing spectrum use and increasing spectrum efficiency.

According to a fourth aspect of the description an apparatus comprises: transmitting means to transmit a request indicating a de-mapping of at least one QoS flow from a unicast radio channel between a secondary node and a radio terminal, and indicating a mapping of the at least one QoS flow to a multicast radio channel between the secondary node and a plurality of radio terminals, the plurality of radio terminals comprising the radio terminal; de-mapping means to de-map received user plane data associated with the at least one QoS flow from the unicast radio channel; and mapping means to map the received user plane data associated with the at least one QoS flow to the multicast radio channel.

According to a fifth aspect of the description, an apparatus comprises: receiving means to receive a request indicating a de-mapping of at least one QoS flow from a unicast radio channel between a secondary node and a radio terminal, and indicating a mapping of the at least one QoS flow to a multicast radio channel between the secondary node and a plurality of radio terminals, the plurality of radio terminals comprising the radio terminal; determining means to determine a radio resource configuration message indicating the de-mapping of the at least one QoS flow from the unicast control channel between the secondary node and the radio terminal and indicating the mapping of the at least one QoS flow to the multicast radio channel between the secondary node and the radio terminal based on the received request; and transmitting means to transmit the radio resource configuration message to the UE.

According to a sixth aspect of the description, an apparatus comprises: receiving means to receive a radio resource configuration message indicating a de-mapping of at least one QoS flow from the unicast control channel between a radio terminal and a secondary node, and indicating a mapping of the at least one QoS flow to a multicast radio channel between the secondary node and a plurality of radio terminals, the plurality of radio terminals comprising the radio terminal; and receiving means to receive user plane data associated with the at least one QoS flow via the multicast radio channel indicated via the radio resource configuration message.

According to a seventh aspect of this description, an apparatus comprises at least one processor, at least one memory including computer program code, and at least one communication module, the at least one memory and computer program code configured, with the at least one processor, and the at least one communication module, to cause the apparatus at least to: transmit a request indicating a de-mapping of at least one QoS flow from a unicast radio channel between a secondary node and a radio terminal, and indicating a mapping of the at least one QoS flow to a multicast radio channel between the secondary node and a plurality of radio terminals, the plurality of radio terminals comprising the radio terminal; de-map received user plane data associated with the at least one QoS flow from the unicast radio channel; and map the received user plane data associated with the at least one QoS flow to the multicast radio channel.

According to an eights aspect of this description, an apparatus comprises at least one processor, at least one memory including computer program code, and at least one communication module, the at least one memory and computer program code configured, with the at least one processor, and the at least one communication module, to cause the apparatus at least to: receive a request indicating a de-mapping of at least one QoS flow from a unicast radio channel between a secondary node and a radio terminal, and indicating a mapping of the at least one QoS flow to a multicast radio channel between the secondary node and a plurality of radio terminals, the plurality of radio terminals comprising the radio terminal; determine a radio resource configuration message indicating the de-mapping of the at least one QoS flow from the unicast control channel between the secondary node and the radio terminal and indicating the mapping of the at least one QoS flow to the multicast radio channel between the secondary node and the radio terminal based on the received request; and transmit the radio resource configuration message to the UE.

According to a ninth aspect of this description, an apparatus comprises at least one processor, at least one memory including computer program code, and at least one communication module, the at least one memory and computer program code configured, with the at least one processor, and the at least one communication module, to cause the apparatus at least to: receive a radio resource configuration message indicating a de-mapping of at least one QoS flow from the unicast control channel between a radio terminal and a secondary node, and indicating a mapping of the at least one QoS flow to a multicast radio channel between the secondary node and a plurality of radio terminals, the plurality of radio terminals comprising the radio terminal; and receive user plane data associated with the at least one QoS flow via the multicast radio channel indicated via the radio resource configuration message.

DESCRIPTION OF THE EMBODIMENTS

Figure 1:
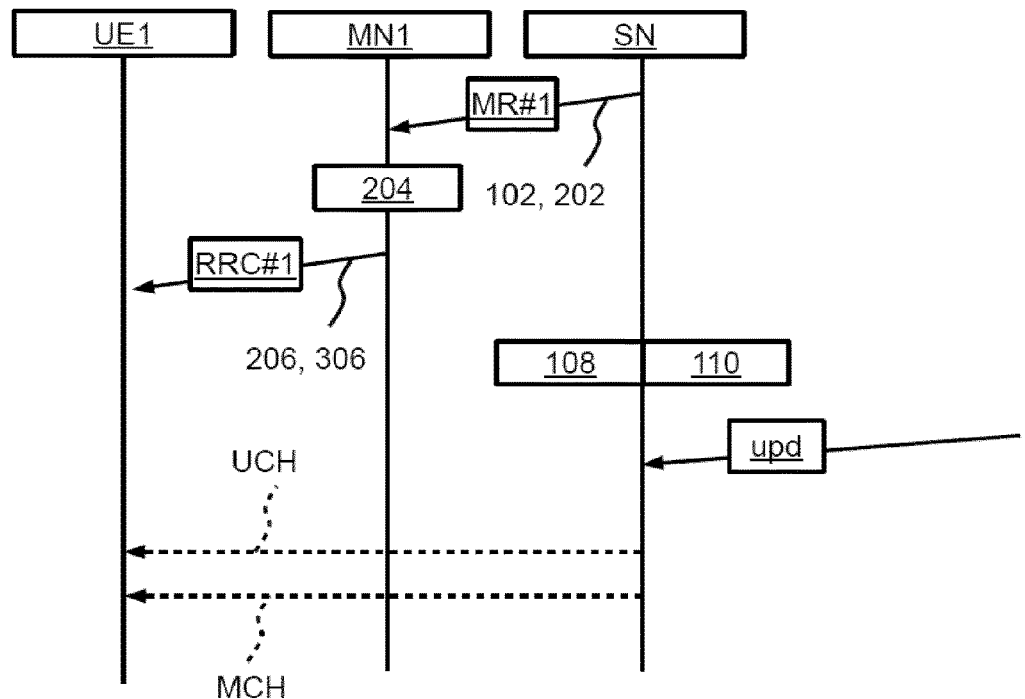
FIGS. 1 to 6 each depict a schematic sequence diagram.

FIG. 1 depicts a schematic sequence diagram. An apparatus SN comprises transmitting means or a transmission module to transmit 102 a request MR #1 indicating a de-mapping of at least one QoS flow from a unicast radio channel UCH between the secondary node or apparatus SN and a radio terminal or apparatus UE, and indicating a mapping of the at least one QoS flow to a multicast radio channel MCH between the secondary node or apparatus SN and a plurality of radio terminals, the plurality of radio terminals comprising the radio terminal or apparatus UE.

The apparatus MN1 comprises receiving means or a receiving module to receive 202 the request MR #1 indicating a de-mapping of the at least one QoS flow from the unicast radio channel UCH between the secondary node or apparatus SN and the radio terminal or apparatus UE, and indicating the mapping of the at least one QoS flow to the multicast radio channel MCH between the secondary node or apparatus SN and a plurality of radio terminals, the plurality of radio terminals comprising the radio terminal or apparatus UE.

The apparatus MN1 comprises determining means or a processing module to determine 204 a radio resource configuration message RRC #1 indicating the de-mapping of the at least one QoS flow from the unicast control channel UCH between the secondary node or apparatus SN and the radio terminal or apparatus UE and indicating the mapping of the at least one QoS flow to the multicast radio channel MCH between the secondary node or apparatus SN and the radio terminal or apparatus UE based on the received request MR #1.

The apparatus MN1 comprises transmitting means or a transmission module to transmit 206 the radio resource configuration message RRC #1.

The apparatus UE1 comprises receiving means or a reception module to receive 306 the radio resource configuration message RRC #1 indicating the de-mapping of at least one QoS flow from the unicast control channel UCH between the radio terminal or apparatus UE and the secondary node or apparatus SN, and indicating the mapping of the at least one QoS flow to the multicast radio channel MCH between the secondary node or apparatus SN and the plurality of radio terminals, the plurality of radio terminals comprising the radio terminal or apparatus UE.

The apparatus SN comprises de-mapping means or a processing module to de-map 108 received user plane data upd associated with the at least one QoS flow from the unicast radio channel UCH.

The apparatus SN comprises mapping means or a processing module to map 110 the received user plane data upd associated with the at least one QoS flow to the multicast radio channel MCH.

As shown in subsequent figures, the apparatuses MN; MN1; MN2 and SN exchange data via a Xn interface and/or an Uu interface during the SN addition of SMBS-related QoS flows to the apparatus SN due to dual connectivity operation or during the SN Modification procedure triggered to reconfigure the apparatus UE for the DRB to SC-MRB switch and conversely.

In dual connectivity, the apparatus SN is a secondary node and the apparatus MN is a master node from the perspective of the respective apparatus UE1. However, this can be considered a role and both the apparatuses MN and SN can be the secondary node and master node for different UEs.

Figure 2:
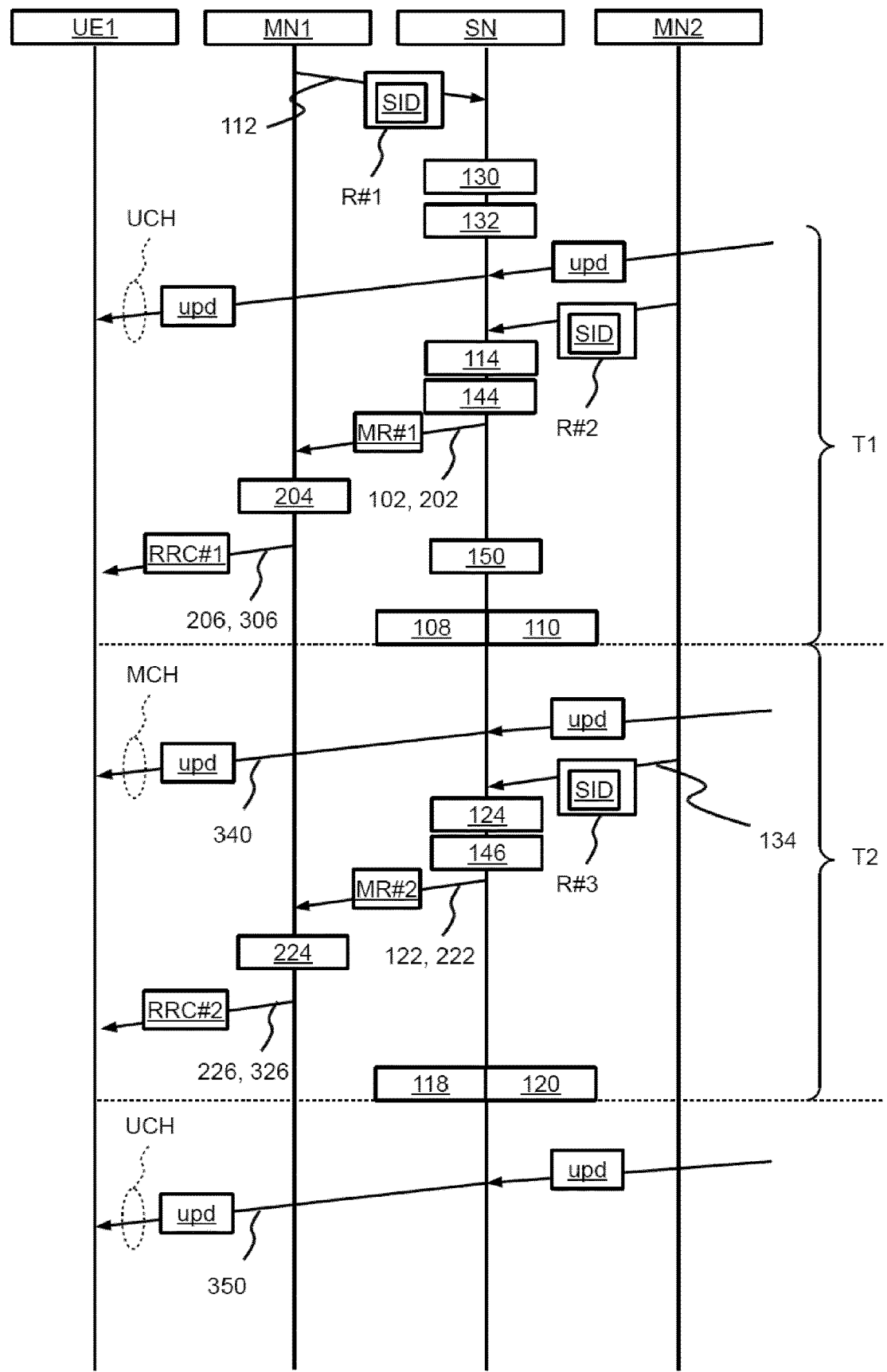

FIG. 2 depicts a schematic sequence diagram. During time period T1, PtM is used to transmit user plane data upd. During time period T2, PtP is used to transmit user plane data upd.

The apparatus SN comprises receiving means or a receiving module to receive 112 a request R #1; R #2 indicating a setup of the at least one of QoS flow at the secondary node or apparatus SN and comprising a service identifier SID associated with the at least one QoS flow.

The request R #1, R #2 comprises the service identifier SID, the at least one or a list of QoS flows or respective indicators, and corresponding QoS parameters.

The apparatus SN comprises creating means or a processing module to create 130 the second radio bearer DRB associated with the unicast channel UCH.

The apparatus SN comprises mapping means or a processing module to map 132 the at least one QoS flow to the unicast radio channel UCH using the existing second radio bearer DRB associated with the unicast channel UCH.

For example, when setting up a DC QoSflow in SN cell, the MN; MN1; MN2 newly informs SN that the offloaded QoSflow is for 5 MBS unicast and it provides the Multicast identifier or service identifier SID to the SN, which allows the SN for counting the number of terminals or entities receiving the service associated with the service identifier SID.

According to an example, the SN newly considers in the counting the offloaded unicast QoSflows in addition to its own unicast QoSflows in a given SN cell.

The apparatus SN comprises mapping means or a processing module to map 132 the at least one QoS flow to the unicast radio channel UCH using the created second radio bearer DRB.

The apparatus SN comprises determining means or a processing module to determine 114 a first number of UEs to be served and/or being served by the secondary node or apparatus SN with the user plane data upd associated with the service identifier SID. If the determined first number of UEs is above a threshold, the de-mapping 108 of the received user plane data upd associated with the at least one QoS flow from the unicast radio channel UCH and the mapping 110 of the received user plane data upd associated with the at least one QoS flow to the multicast radio channel SC-MRB is conducted.

For example, the apparatus SN receives a further request R #2, which indicates that another UE wants to join or receive user plane data being associated with the service identifier SID as that of received via the request R #1. Then the determination 114 leads to a higher number of UEs associated with the service identifier SID than the predefined or flexible threshold. Accordingly, a switch to the multicast channel is initiated.

According to a determining means or processing module, the apparatus SN determines 144, for example based on the first number of UEs, that a switch from the at least one unicast channel UCH to the multicast channel MCH has to take place. Accordingly, the request MR #1 is determined and transmitted.

In order to use the multicast channel MCH, a creating means or processing module is configured to create 150 a multicast bearer SC-MRB associated with the multicast channel MCH.

The de-mapping 108 of the received user plane data upd associated with the at least one QoS flow from the unicast radio channel UCH is based on the received service identifier SID. The mapping 110 of the received user plane data upd associated with the at least one QoS flow to the multicast radio channel SC-MRB is based on the received service identifier SID.

The request MR #1 comprises an indication for setting up of a first radio bearer SC-MBR associated with the multicast radio channel MCH.

According to an example, the request MR #1 comprises an indication for releasing a second radio bearer DRB associated with the unicast channel UCH.

The apparatus SN comprises receiving means or a receiving module to receive 134 a further request R #3 indicating a release of the at least one QoS flow at the secondary node and comprising a service identifier SID associated with this at least one QoS flow. The de-mapping 118 of the received user plane data upd from the multicast radio channel MCH is based on the received service identifier SID and wherein the mapping 120 of the received user plane data upd to the unicast radio channel UCH for other UEs is based on the received service identifier SID.

The apparatus SN comprises determining means or a processing module to determine 124 a second number of UEs to be served and/or being served with the user plane data upd associated with the service identifier SID.

According to a determining means of processing module, the SN determines 146, for example based on the first number of UEs, that a switch from the multicast channel MCH to the at least one unicast channel UCH will take place. Accordingly, the request MR #2 is determined and transmitted.

The apparatus SN comprises transmitting means or a transmission module to transmit 122, if the determined second number of UEs is below a threshold, a further request MR #2 indicating a mapping of the at least one QoS flow to the unicast radio channel UCH between the secondary node or apparatus SN and the radio terminal or apparatus UE, and indicating a de-mapping of the at least one QoS flow from the multicast radio channel MCH between the secondary node or apparatus SN and the plurality of radio terminals, the plurality of radio terminals comprising the radio terminal or apparatus UE.

The apparatus SN comprises the de-mapping means or the processing module to de-map 118, if the determined second number of UEs is below the threshold, the received user plane data upd associated with the at least one QoS flow from the multicast radio channel MCH.

For other QoS flows of an other radio terminals like the radio terminal or apparatus UE2, the user plane data upd is de-mapped from the multicast radio channel MCH for an associated at least one further QoS flow of the other radio terminal or apparatus UE2. Accordingly, the received user plane data upd is mapped to the unicast channel UCH for the at least one further QoS flow of the other radio terminal or apparatus UE2.

The apparatus SN comprises the mapping means or the processing module to map 120, if the determined second number of UEs is below the threshold, the received user plane data upd associated with the at least one QoS flow to respective unicast channels UCH.

The apparatus MN1, MN2 comprises receiving means or a reception module to receive 222 the further request MR #2 indicating the mapping of the at least one QoS flow to the unicast radio channel UCH between the secondary node or apparatus SN and the radio terminal or apparatus UE, and indicating the de-mapping of the at least one QoS flow from the multicast radio channel MCH between the secondary node or apparatus SN and the plurality of radio terminals, the plurality of radio terminals comprising the radio terminal or apparatus UE.

The apparatus MN1, MN2 comprises determining means or a processing module to determine 224 a further radio resource configuration message RRC #2 indicating the mapping of the at least one QoS flow to the unicast radio channel UCH, and indicating the de-mapping of the at least one QoS flow from the multicast radio channel MCH based on the received further request MR #2.

The apparatus MN1, MN2 comprises transmitting means or a transmission module to transmit 226 the further radio resource configuration message RRC #2.

The radio resource configuration message RRC #2 indicates a release of the multicast radio bearer associated with the de-mapped at least one QoS flow.

The apparatus UE1 comprises receiving means or a reception module to receive 340 the user plane data upd associated with the at least one QoS flow via the multicast radio channel MCH indicated via the radio resource configuration message RRC #1.

The apparatus UE1 comprises receiving means or a reception module to receive 350 user plane data upd associated with the at least one QoS flow via the unicast radio channel UCH indicated via the further radio resource configuration message RRC #2.

A service associated with the at least one QoS flow is a multicast data service and/or the service identifier SID identifies the multicast data service identifier.

The apparatus UE comprises receiving means or a reception module to receive 326 the further radio resource configuration message RRC #2 indicating the mapping of the at least one QoS flow to the unicast radio channel UCH, and indicating the de-mapping of the at least one QoS flow from the multicast radio channel MCH.

Figure 3:
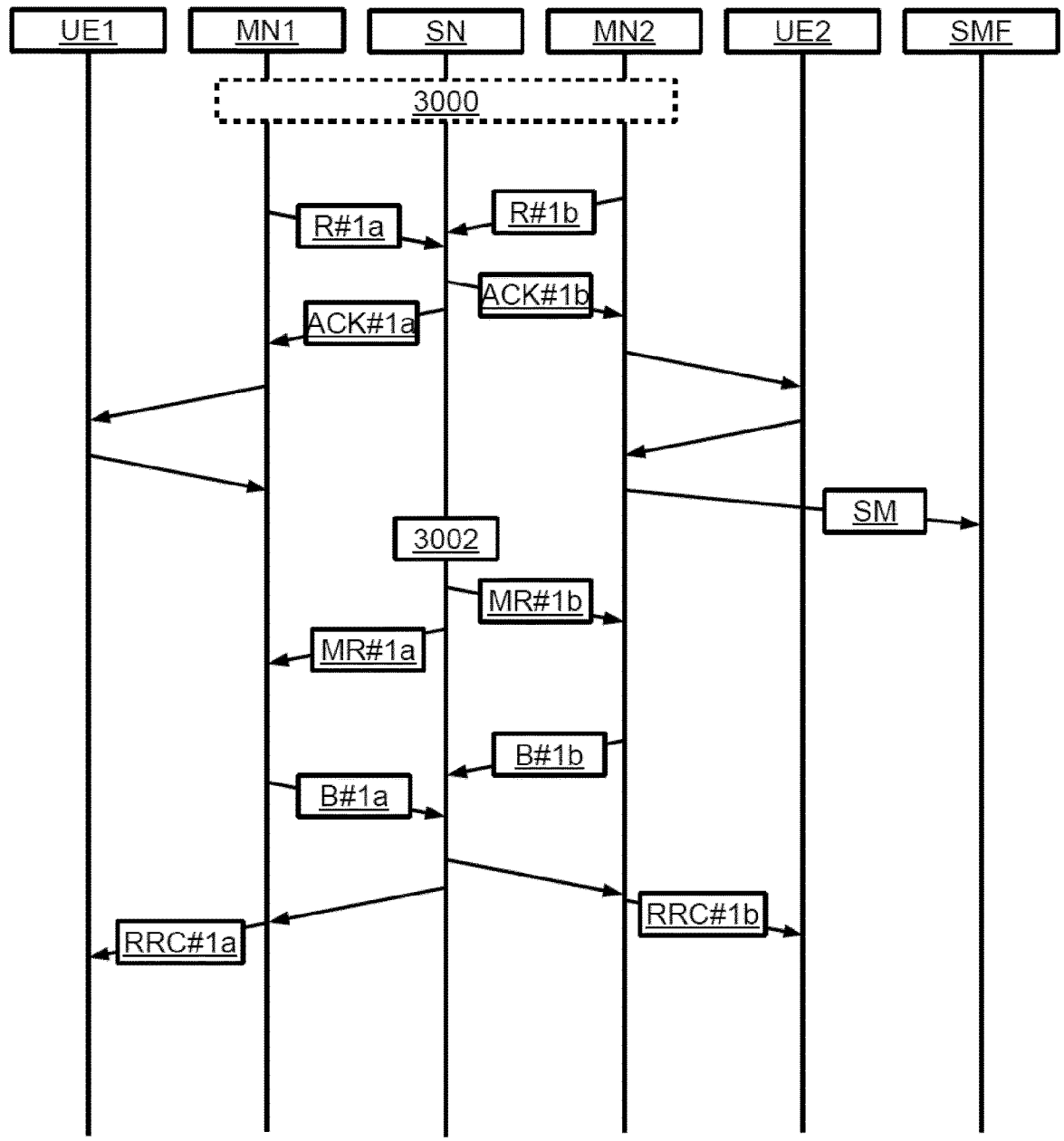

FIG. 3 depicts a schematic sequence diagram. In this example, there is a switch to PtM in the apparatus SN and the apparatus MN1 is in control of a DRB. According to block 3000, SC-MRB is off in the PScell of UE1 and UE2.

Apparatus MN1 offloads to apparatus SN SMBS QoS flows of 5 MBS service identified by the service identifier for the UE1. The PScell of apparatus SN is in PtP mode at this stage i.e. no SC-MRB is setup. Apparatus MN2 also offloads to apparatus SN SMBS QoS flows of 5 MBS service identified by the service identifier for an apparatus UE2. Both apparatus MN1, MN2 indicate in the SN Addition/Modification Request R #1a, R #1b corresponding service identifiers, and the list of QoS flows offloaded for the service identifier and associated QoS parameters. In response to the received requests R #1, R #1b, the apparatus SN transmits an SN addition/Modification request acknowledgement ACK #1a, ACK #1b to the apparatus MN1, MN2, respectively. Apparatus MN2 transmits a PDU Session Modification message SM to an SMF.

Due to the addition of apparatuses UE1 and UE2, the apparatus SN decides that the number of UEs in the PScell where UE1 and UE2 are served in SN is high enough to decide 3002 to switch to PtM mode.

The apparatus SN informs the apparatus MN1 by sending an SN Modification Required message MR #1a that it plans to setup SC-MRB for the service indicated by the service indicator and includes corresponding radio configuration. The apparatus SN also informs apparatus MN2 similarly via SN Modification Required request MR #1b.

The apparatus MN1, MN2 decides to proceed and triggers an SN Modification Request message B #1a, B #1b including the order to demap QoSflows from unicast DRB, setup SC-MRB and map QoSflows to SC-MRB in apparatus SN for the apparatus UE. This generates appropriate RRC reconfiguration via message RRC #1a, RRC #1b towards the apparatus UE1, UE2, respectively.

Figure 4:
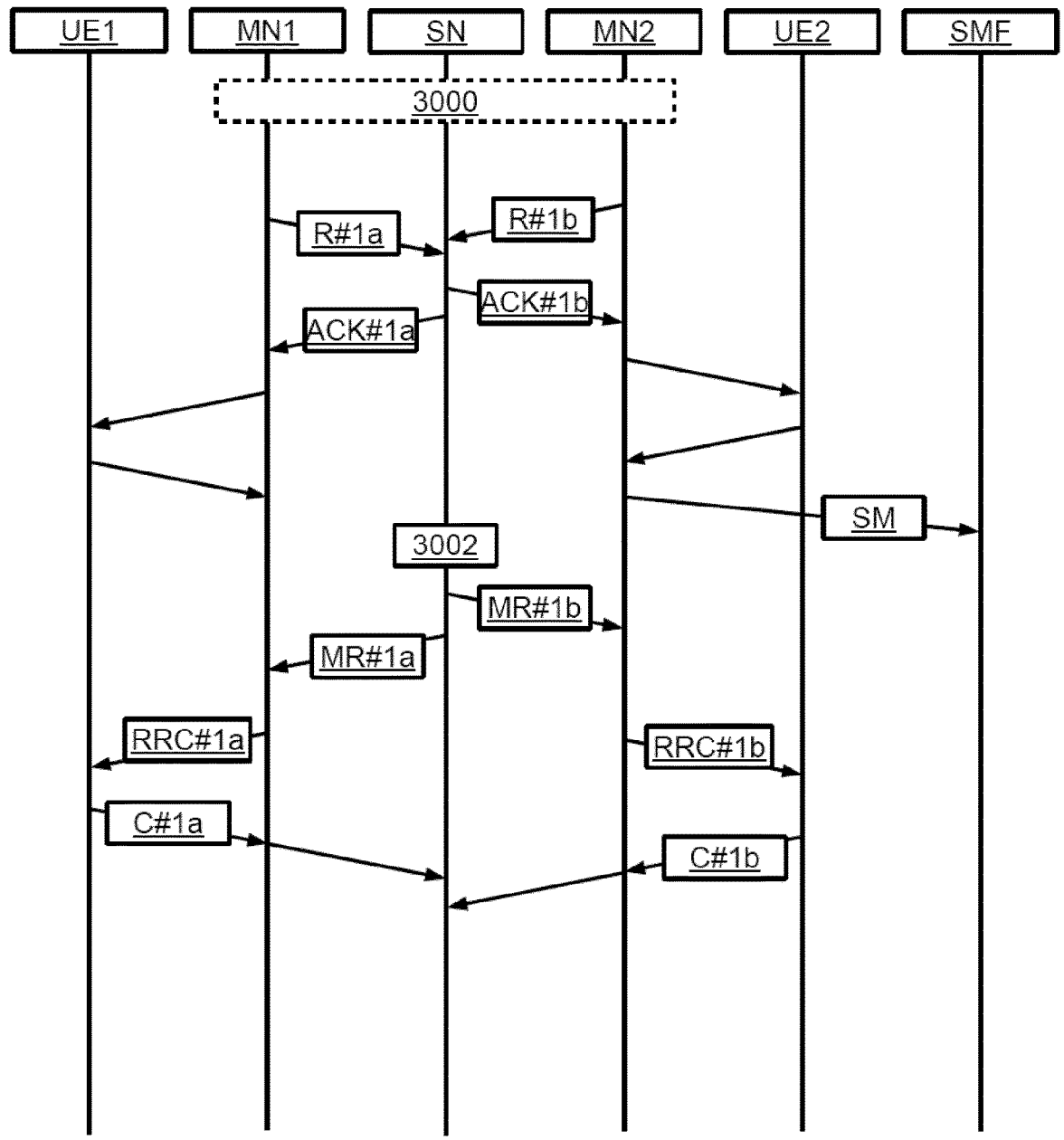

FIG. 4 depicts a schematic sequence diagram. Reference is made to FIG. 4. In this example, there is a switch to PtM in apparatus SN and the apparatus SN is in control of the DRB release.

The apparatus SN triggers the Modification Required procedure towards the apparatus MN1, MN2 by sending the SN Modification Required message MR #1a, MR #1b in order to setup SC-MRB for the service according to the service identifier and to release the unicast DRB for the service, for example including the corresponding necessary radio configurations. This triggers corresponding RRC reconfiguration of the apparatuses UE1 and UE2. The application of the received radio configuration via RRC #1a, RRC #1b is acknowledged by the apparatus UE1, UE2 via messages C #1a, C #1b towards apparatus SN.

Figure 5:
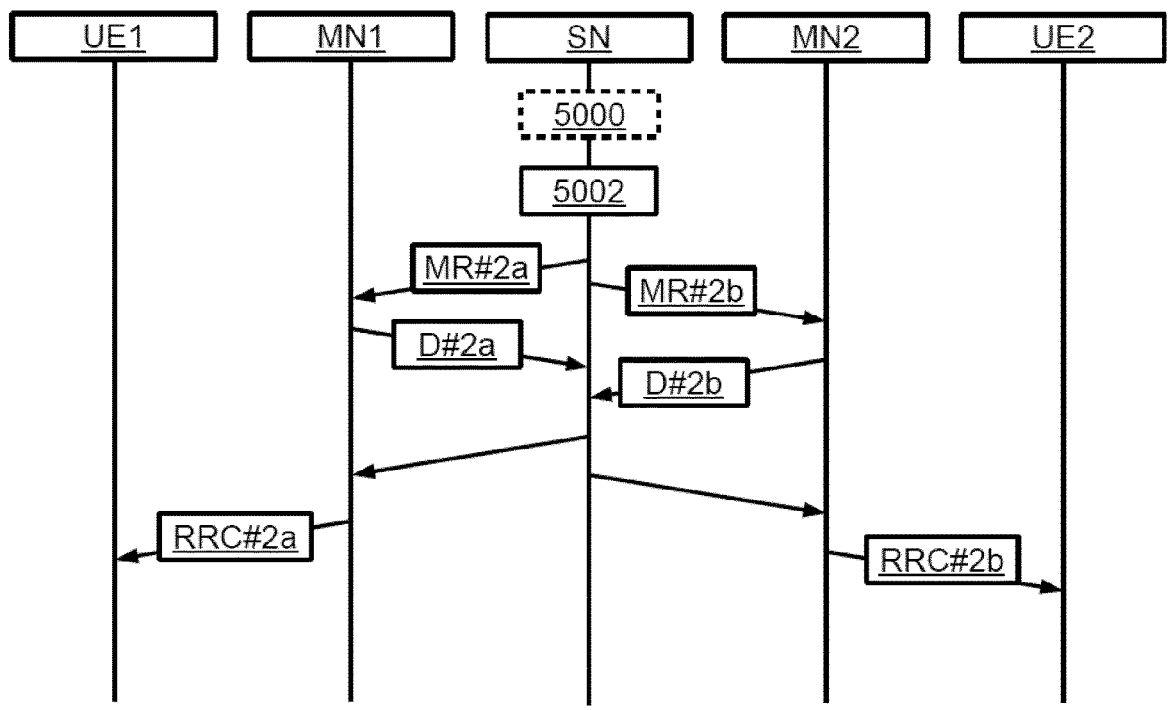

FIG. 5 depicts a schematic sequence diagram. In this example, there is a switch to PtP in the apparatus SN and the apparatus MN is in control of the SC-MRB release. According to block 5000, SC-MBR is on in the PScell of apparatuses UE1 and UE2. Therefore, PtM is in use for the SMBS service identified by the service identifier in the PScell, which serves apparatuses UE1 and UE2. Due to some event or criteria e.g. some UEs leaving the SMBS service, the apparatus SN decides 5002 to move to PtP for the SMBS service.

The apparatus SN informs the apparatus MN1, MN2 that it wants to switch to PtP by sending SN Modification Required message MR #2a, MR #2b including the indication to setup DRB instead of SC-MRB and appropriate DRB radio configuration, including also the indication to demap QoSflows from SC-MRB and to map QoSflows to DRB.

Apparatus MN1, MN2 decides to proceed and triggers an SN Modification Request procedure via message D #2a, D #2b including the order to release SC-MRB and setup unicast DRB in apparatus SN for the UE and indicating to map the QoSflows to the DRB. This generates appropriate RRC reconfiguration via messages RRC #2a, RRC #2b towards the UE.

Figure 6:
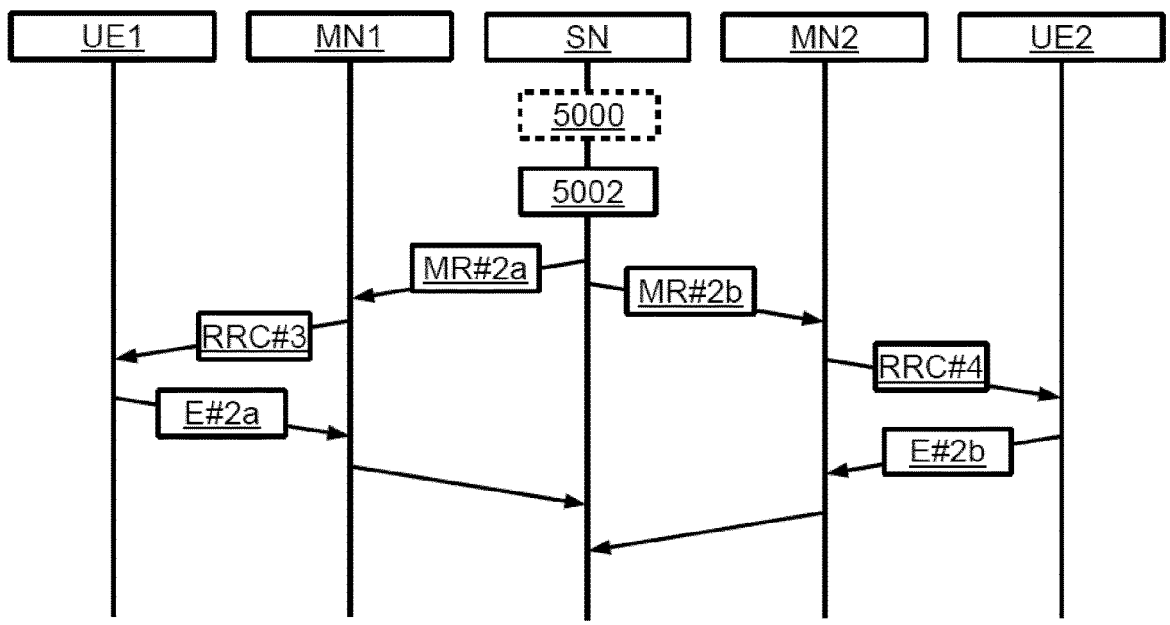

FIG. 6 depicts a schematic sequence diagram. Reference is made to FIG. 5. In this example, there is a switch to PtP in the apparatus SN and the apparatus SN is in control of the SC-MRB release. The apparatus SN triggers the Modification Required procedure towards the MN1 by sending an SN Modification Required message MR #2a, MR #2b in order to setup unicast DRB for the service, release the SC-MRB for the service, and remap the QoS flows for the service to the DRB, for example including the corresponding necessary radio configurations. This triggers corresponding RRC reconfiguration of the apparatus UE1, UE2 via the messages RRC #2a, RRC #2b. After applying the radio resource configuration, the apparatus UE1, UE2 confirms this via a message E #2a, E #2b.

Figure 7:
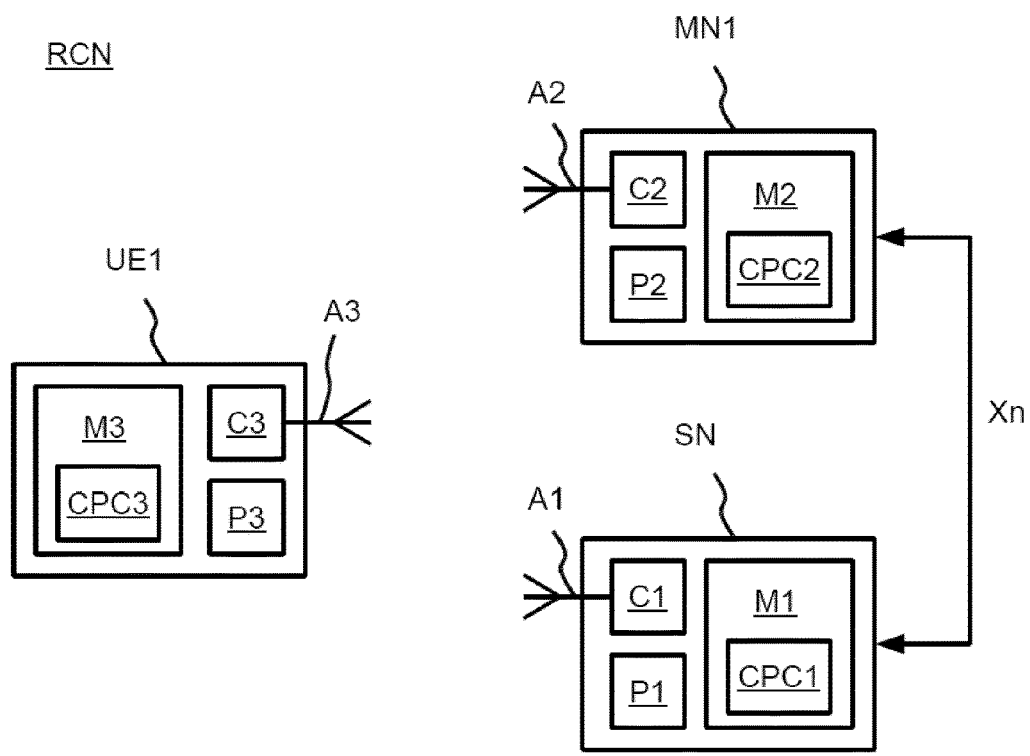
FIG. 7 depicts schematically a radio communications network.

FIG. 7 schematically depicts a radio communications network RCN. The apparatus SN, MN1, UE1 comprises at least one processor P1, P2, P3, at least one non-volatile memory M1, M2, M3 including computer program code CPC1, CPC2, CPC3 and at least one communication module C1, C2, C3 that is coupled with at least one antenna A1, A2, A3. The at least one memory M1, M2, M3 and computer program code CPC1, CPC2, CPC3 are configured, with the at least one processor P1, P2, P3, and the at least one communication module or communication means C2, C2, C3, to cause the apparatus SN, MN1, UE1 at least to operate according to the present description. The apparatuses MN1 and SN communicate via the Xn interface. The apparatuses MN1 and UE1/SN and UE1 communicate via dedicated radio channels. Certain abbreviations that may be found in the description and/or in the figures are herewith defined as follows:

5 MBS 5G Multicast Broadcast Service
DC Dual Connectivity
DRB Data Radio Bearer
MN Master Node
PtP Point to Point
PtM Point to Multipoint
QoS Quality of Service
SC-MRB Single Cell Multicast Radio Bearer
SN Secondary Node
SMF Session Management Function
PSCell Primary Secondary Cell
UE User Equipment
Uu interface between UE and MN or between UE and SN
Xn interface between MN and MN Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:
1. A method performed by a secondary node (SN), the method comprising:
 determining that a number of radio terminals to be served with user plane data (UPD) associated with at least one Quality of Service (QOS) flow exceeds a threshold;

transmitting, in response to the determining, a request indicating a de-mapping of the at least one QoS flow from a unicast radio channel (UCH) between the SN and a radio terminal (UE), and indicating a mapping of the at least one QoS flow to a multicast radio channel (MCH) between the SN and a plurality of radio terminals, the plurality of radio terminals comprising the UE;

de-mapping the UPD associated with the at least one QoS flow from the UCH; and mapping UPD associated with the at least one QoS flow to the MCH.

2. The method according to claim 1, wherein the transmitted request comprises an indication for setting up of a first radio bearer (SC-MBR) associated with the MCH.

3. The method according to claim 1, wherein the transmitted request comprises an indication for releasing a second radio bearer (DRB) associated with the UCH.

4. The method according to claim 3, further comprising:
creating the second DRB associated with the UCH; and
mapping the at least one QoS flow to the UCH using the created second DRB.

5. The method according to claim 3, further comprising:
mapping of the at least one QoS flow to the UCH using the second DRB associated with the UCH.

6. A method performed by a master node (MN), the method comprising:
receiving a first request indicating a de-mapping of at least one quality of service (QOS) flow from a unicast radio channel (UCH) between a secondary node (SN) and a radio terminal (UE), and indicating a mapping of the at least one QoS flow to a multicast radio channel (MCH) between the SN and a plurality of radio terminals, the plurality of radio terminals comprising the UE;
determining, based on the received first request, a first radio resource configuration message indicating the de-mapping of the at least one QoS flow from the UCH between the SN and UE and indicating the mapping of the at least one QoS flow to the MCH between the SN and the UE;
transmitting the first radio resource configuration message to the UE;
receiving a second request indicating a mapping of the at least one QoS flow to the UCH between the SN and the UE, and indicating a de-mapping of the at least one QoS flow from the MCH between the SN and the plurality of radio terminals;
determining, based on the received second request, a second radio resource configuration message indicating the mapping of the at least one QoS flow to the UCH, and indicating the de-mapping of the at least one QoS flow from the MCH; and
transmitting the second radio resource configuration message to the UE.

7. A method performed by a radio terminal (UE), the method comprising:
receiving a first radio resource configuration message indicating a de-mapping of at least one QoS flow from a unicast radio channel (UCH) between the UE and a secondary node (SN), and indicating a mapping of the at least one QoS flow to a multicast radio channel (MCH) between the SN and a plurality of radio terminals, the plurality of radio terminals comprising the UE;

receiving user plane data (UPD) associated with the at least one QoS flow via the MCH in accordance with the first radio resource configuration message;

receiving a second radio resource configuration message indicating a mapping of the at least one QoS flow to the UCH, and indicating a de-mapping of the at least one QoS flow from the MCH; and receiving user plane data (UPD) associated with the at least one QoS flow via the UCH in accordance with the second radio resource configuration message.

8. The method according to claim 7, wherein the first radio resource configuration message indicates a release of the UCH associated with the de-mapped at least one QoS flow.

9. A secondary node (SN) comprising:
at least one processor,
at least one memory including computer program code, and
at least one communication module, the at least one memory and computer program code are configured, with the at least one processor and the at least one communication module, to cause the SN at least to:
determine that a number of radio terminals to be served with user plane data (UPD) associated with at least one Quality of Service, QoS, flow exceeds a threshold;
transmit, in response to the determination, a request indicating a de-mapping of the at least one QoS flow from a unicast radio channel (UCH) between the SN and a radio terminal (UE), and indicating a mapping of the at least one QoS flow to a multicast radio channel (MCH) between the SN and a plurality of radio terminals, the plurality of radio terminals comprising the UE;
de-map (UPD) associated with the at least one QoS flow from the unicast radio channel (UCH); and
map UPD associated with the at least one QoS flow to the MCH.

10. The secondary node (SN) according to claim 9, wherein the request further comprises an indication for setting up of a first radio bearer (SC-MBR) associated with the MCH.

11. The secondary node (SN) according to claim 9, wherein the request further comprises an indication for releasing a second radio bearer (DRB) associated with the UCH.

12. The secondary node (SN) according to claim 11, wherein the SN is further configured to:
create the second radio bearer (DRB) associated with the UCH; and
map the at least one QoS flow to the UCH using the created second radio bearer (DRB).

13. The secondary node (SN) according to claim 11, wherein the SN is further configured to map the at least one QoS flow to the UCH using the second DRB associated with the UCH.

14. A master node (MN) comprising:
at least one processor, at least one memory including computer program code, and at least one communication module, the at least one memory and computer program code configured, with the at least one processor, and the at least one communication module, to cause the MN at least to:
receive a first request indicating a de-mapping of at least one quality of service (QOS) flow from a unicast radio channel (UCH) between a secondary node (SN) and a radio terminal (UE), and indicating a mapping of the at least one QoS flow to a multicast radio channel (MCH)

between the SN and a plurality of radio terminals, the plurality of radio terminals comprising the UE;
determine, based on the received first request, a first radio resource configuration message indicating the de-mapping of the at least one QoS flow from the UCH between the SN and UE and indicating the mapping of the at least one QoS flow to the MCH between the SN and the UE;
transmit the first radio resource configuration message to the UE;
receive a second request indicating a mapping of the at least one QoS flow to the UCH between the SN and the UE, and indicating a de-mapping of the at least one QoS flow from the MCH between the SN and the plurality of radio terminals;
determine, based on the received second request, a second radio resource configuration message indicating the mapping of the at least one QoS flow to the UCH, and indicating the de-mapping of the at least one QoS flow from the MCH; and
transmit the second radio resource configuration message to the UE.

15. A radio terminal (UE) comprising:
at least one processor, at least one memory including computer program code, and at least one communication module, the at least one memory and computer program code configured, with the at least one processor, and the at least one communication module, to cause the UE at least to:
receive a first radio resource configuration message indicating a de-mapping of at least one Quality of Service, QoS flow from a unicast radio channel (UCH) between the UE and a secondary node (SN), and indicating a mapping of the at least one QoS flow to a multicast radio channel (MCH) between the SN and a plurality of radio terminals, the plurality of radio terminals comprising the UE;
receive user plane data (UPD) associated with the at least one QoS flow via the MCH in accordance with indicated via the first radio resource configuration message;
receive a second radio resource configuration message indicating a mapping of the at least one QoS flow to the UCH, and indicating a de-mapping of the at least one QoS flow from the MCH; and
receive user plane data (UPD) associated with the at least one QoS flow via the UCH in accordance with the second radio resource configuration message.

16. The radio terminal (UE) according to claim 15, wherein the first radio resource configuration message indicates a release of the UCH associated with the de-mapped at least one QoS flow.

* * * * *